United States Patent [19]

Lee

[11] Patent Number: 4,491,692
[45] Date of Patent: Jan. 1, 1985

[54] LIGHT-EMITTING DEVICE MOUNTED UNDER KEYBUTTONS OF A KEYBOARD

[76] Inventor: Shan S. Lee, 2 Fl., 40, Alley 27, La. 55, Sec. 1 Hsing Lung Rd., Taipei, Taiwan

[21] Appl. No.: 439,407

[22] Filed: Nov. 5, 1982

[51] Int. Cl.³ .............................................. H04M 1/22
[52] U.S. Cl. ................................. 179/90 L; 179/81 C; 200/314; 340/365 R; 362/24
[58] Field of Search ................. 179/90 L, 81 C, 84 L, 179/94, 90 K, 178; 200/314; 340/365 R; 362/24, 30, 84

[56] References Cited

U.S. PATENT DOCUMENTS 4,056,701 11/1977 Weber .......................... 340/365 R X
4,131,777 12/1978 Bailey et al. ..................... 200/314 X Primary Examiner—Stafford D. Schreyer
Attorney, Agent, or Firm—Armstrong, Nikaido, Marmelstein & Kubovcik

[57] ABSTRACT

The present invention relates to a light-emitting device mounted under the keys of a keyboard, particularly to a device which emits light by using the effect of light-emitting diodes which are mounted below every key of a keyboard. When a user picks up the handset of a telephone or when the switch of a device is turned on, a closed circuit which emits light is formed so that the user can clearly see the symbols on the keys with the help of the light emitted by the light-emitting diodes. When the handset is placed on the telephone set, the power supply is cut off. Thus, the object of being able to telephone in darkness without difficulty is accomplished.

3 Claims, 3 Drawing Figures

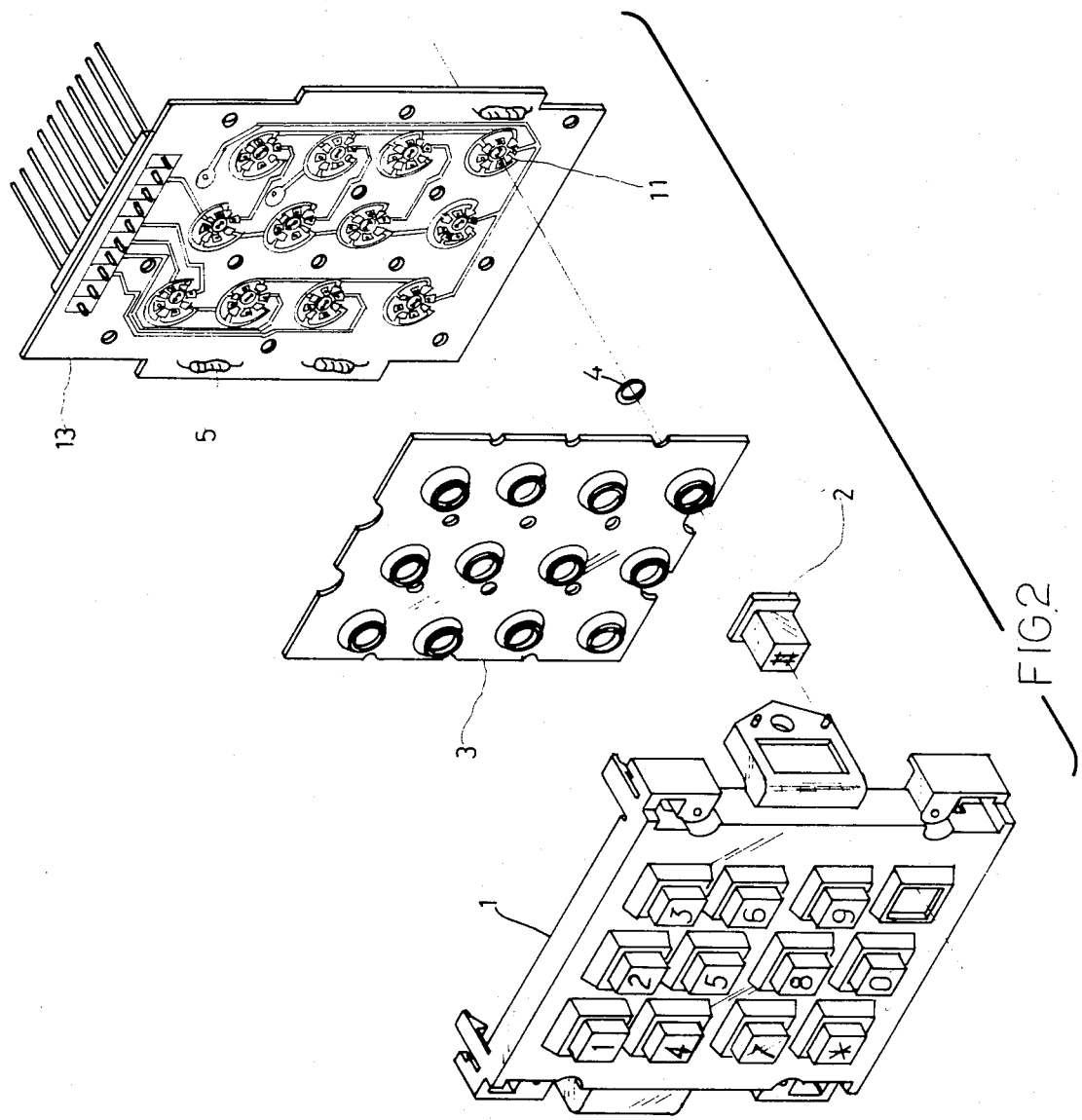

LIGHT-EMITTING DEVICE MOUNTED UNDER KEYBUTTONS OF A KEYBOARD

BACKGROUND OF THE INVENTION

The present invention relates to an improvement in a keyboard, particularly to the utilization of the light-emitting effect of light-emitting diodes which are mounted under transparent keys of the keyboard. The user is thus able to telephone at night or in darkness without the help of any other illumination. The symbols and the legends of the keys can be clearly seen with the help of the light emitted by the light-emitting diodes only when the handset of the telephone set is picked up or only when the switch is turned on.

Owing to the advance of civilization, human beings want to use time effectively in order to reach the highest working efficiency. The telephone is designed for the urgent need of human beings. Thus, the telephone has become an indispensable communicating device of every family and company. There is, however, often a problem particularly when telephoning somebody in darkness or in a car, because the keys or symbols cannot be seen clearly. Thus, it is necessary to have another light-emitting device in order to telephone in darkness, and extra effort must be made to switch on a lamp before telephoning. Considering that the matter described above often happens in the cold winter, it is a very annoying problem. Although, there is a light-emiting device using a bulb or a fluorescent tube, it occupies a large part of the keyboard and only indicates the line being used, and it is easily burned out.

The primary object of the present invention is to provide a light-emitting device mounted under the keys of a keyboard, which emits light by using light-emitting diodes, so that the user may easily distinguish the symbols on the keys in a dark place or in darkness by means of the light emitted by the light-emitting device without any other illuminative device. Thus, the user can telephone directly and immediately. The object of practicality is thus, accomplished.

Another object of the present invention is to provide a light-emitting device mounted on the keys of a keyboard in which the switch of the handset is used for connecting the light-emitting diode in series, so that the circuit of the light-emitting diodes are cut off automatically when the switch is turned off when the handset is placed on the telephone set. The object of convenience is thus, accomplished.

Still another object of the present invention is to provide a novel light-emitting device mounted under the keys of a keyboard. The device is bonded on a PC board and is protected by being covered with epoxy resin which prolongs the life of the device and prevents damage. In particular, the present device does not occupy much space inside the keys and since the keyboard can be made as an extremely thin profile, the cost is decreased. The object of economy is thus, accomplished.

A further object of the present invention is to provide a novel light-emitting device mounted under the keys of a keyboard and is characterized in that the light emitted by the light-emitting device passes through an elastic actuator which consists of a conductive rubber pad contact element and an insulated elastic rubber dome sheet to the transparent keys. The keys also function to protect the light-emitting diode from pressure contact when the key is pushed.

BRIEF DESCRIPTION OF THE DRAWINGS

FIG. 2 is a fragmentary perspective view of the present invention;

DETAILED DESCRIPTION OF THE PREFERRED EMBODIMENT

Figure 1B:
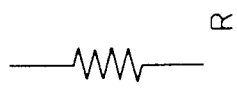
FIG. 1 shows the circuit used in the present invention.
Figure 1C:
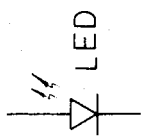
Figure 1A:
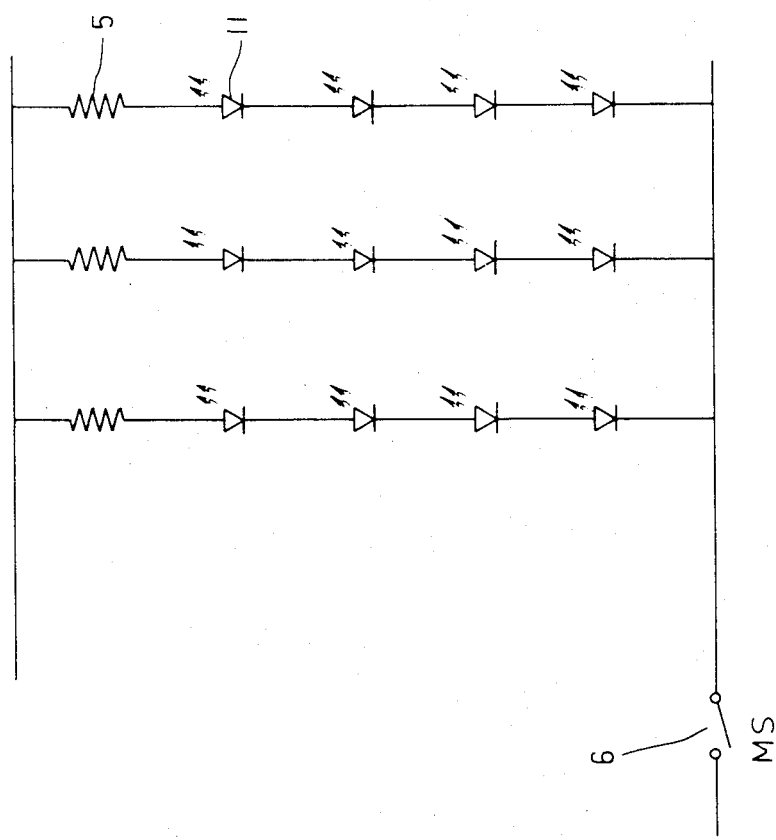
Figure 3:
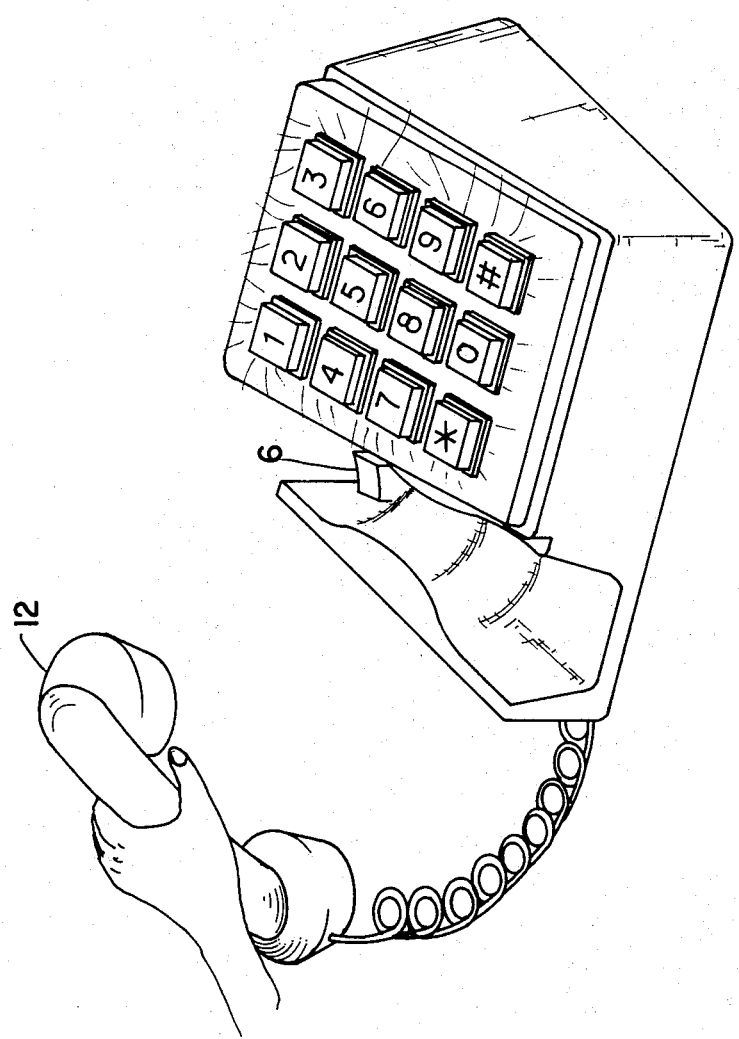
FIG. 3 shows an embodiment of the present invention.

FIG. 1 shows a circuit used in the present invention. Switch 6 on which handset 12 is placed, is turned on when handset 12 is picked up, which causes all of the light supplies 11 to emit light. When switch 6 is turned off, when handset 12 is placed on the telephone set, all of the light supplies 11 are cut off. Thus, it is really convenient for us to use this kind of telephone set.

Referring to FIG. 2, keys 2 of the present invention are mounted on keyboard 1. Holes in the rear of the keys face the rear of keyboard 1 and are adapted to the protuberances or projections of insulated elastic rubber sheet 3. The protuberances of insulated elastic rubber sheet 3 are moved downward by pressing key 2 such that the conductive rubber pad or ring 4 at the inner side of elastic dome rubber sheet 3 and the PC board 13 conduct by contact with each other. The light supplies 11 are bonded on PC board 13. The light-emitting device 8 and its saturated light-emitting circuit are mounted in the middle of a contact area of the switching circuit of the key of the keyboard. The other parts are the same as those of a conventional keyboard.

Although this invention has been described in its preferred embodiment with a certain degree of particularity, it is understood that the present disclosure of the preferred form has been made only by way of example and that numerous changes in the details of construction and combination and arrangement of parts may be resorted to without departing from the spirit and the scope of the invention as hereinafter claimed.

I claim:

1. A keyboard comprising a plurality of keys; a power switch; a plurality of light emitting diode means, each light emitting diode means being mounted beneath a corresponding key; a plurality of conductive rubber pads having an opening therethrough, each rubber pad being positioned above each of said light emitting diode means; and an insulated elastic rubber dome sheet having open portions surrounded by projecting portions, said dome sheet being positioned above said conductive rubber pads, such that said conductive rubber pads and said dome sheet are positioned between said light emitting diode means and said keys for preventing pressure on said light emitting diode means when said keys are activated; wherein when said power switch is on, said light emitting diode means are operative to emit light which passes through the openings in said rubber pads and dome sheet thereby illuminating said keys from below; and wherein when said power switch is off, said light emitting diode means are not operative and said keys are not illuminated.

2. A keyboard as set forth in claim 1, wherein each of said light emitting diode means comprises a light emitting diode and an activating circuit, positioned in the center of the contact area of a switching circuit of a corresponding said key.

3. A keyboard as set forth in claim 1, wherein said projecting portions of said rubber dome sheet have a shape corresponding to the shape of the bottom of said keys.

* * * * *